US007199798B1

(12) United States Patent
Echigo et al.

(10) Patent No.: US 7,199,798 B1
(45) Date of Patent: Apr. 3, 2007

(54) METHOD AND DEVICE FOR DESCRIBING VIDEO CONTENTS

(75) Inventors: Tomio Echigo, Yokohama (JP); Masato Kurokawa, Yokohama (JP); Junji Maeda, Tokyo-to (JP); Alberto Tomita, Yokohama (JP)

(73) Assignee: International Business Machines Corp, Armonk, NY (US)

( * ) Notice: Subject to any disclaimer, the term of this patent is extended or adjusted under 35 U.S.C. 154(b) by 0 days.

(21) Appl. No.: 09/890,168

(22) PCT Filed: Jan. 20, 2000

(86) PCT No.: PCT/JP00/00269

§ 371 (c)(1),
(2), (4) Date: Oct. 30, 2001

(87) PCT Pub. No.: WO00/45335

PCT Pub. Date: Aug. 3, 2000

(30) Foreign Application Priority Data

Jan. 26, 1999 (JP) ................................. 11-016554

(51) Int. Cl.
*G06T 13/00* (2006.01)
*G03B 19/18* (2006.01)

(52) U.S. Cl. ........................................ 345/473; 352/39
(58) Field of Classification Search ................ 345/632, 345/81, 719, 721–723, 473, 474; 463/43; 725/115, 143; 348/169, 157, 586, 598, 600; 382/103; 375/240.1, 240.8, 240.16; 715/723, 715/726; 352/39
See application file for complete search history.

(56) References Cited

U.S. PATENT DOCUMENTS

| | | | |
|---|---|---|---|
| 5,969,755 A * | 10/1999 | Courtney | 348/143 |
| 6,280,323 B1 * | 8/2001 | Yamazaki et al. | 463/4 |
| 6,665,423 B1 * | 12/2003 | Mehrotra et al. | 382/107 |
| 6,741,655 B1 * | 5/2004 | Chang et al. | 375/240.26 |
| 2001/0040575 A1 * | 11/2001 | Haga et al. | 345/473 |
| 2003/0081813 A1 * | 5/2003 | Astle | 382/103 |

OTHER PUBLICATIONS

Nevenka Dimitrova et al., Rx for semantic video database retrieval, Proceedings of the second ACM international conference on Multimedia, pp. 219-226, Year of publication 1994.*
"Motion video analysis using planar parallax" Sawhney, H. (1994). Motion video analysis using planar parallax. vol. 2185, pp. 231-242.*
"Integrated image and speech analysis for content-based video indexing" Chang et al. Multimedia Computing and Systems, 1996., Proceedings of the Third IEEE International Conference on , Jun. 17-23, 1996 pp. 306-313.*
"Automatic classification of tennis video for high-level content-based retrieval", Sudhir et al.; IEEE International Workshop onContent-Based Access of Image and Video Database, 1998. Proceedings., Jan. 3, 1998 pp. 81-90.*

(Continued)

*Primary Examiner*—Ryan Yang
(74) *Attorney, Agent, or Firm*—Daniel P. Morris, Esq.; Perman & Green, LLP (57) ABSTRACT

An object of the present invention is to provide a description method for efficiently representing contents of motion picture with a small data volume. The organization of the present invention (1) represents a trajectory of how each object has moved over time by using reference plane representing position information of each object, (2) sets a description unit based on a type of action of each object by using changes in shape of each object, (3) has actions of each object represented as each behavioral section, and (4) comprises a description facility capable of reading and interpreting definition of an object dependent on video contents, definition of classes of actions, and definition of interpretation of a scene by interaction of plural objects.

19 Claims, 5 Drawing Sheets

OTHER PUBLICATIONS

"Automatic parsing of TV soccer programs", Gong et al.; Proceedings of the International Conference on Multimedia Computing and Systems, 1995., May 5-18, 1995 pp. 167-174.*

"Scene chu no tanjikan dosa kijutsu wo mochiita eizo naiyo kensaku hoshiki no teian", Wararu Miyamori, Proceedings of Symposium, The Information Processing Society of Japan, No. 10, pp. I.75-I.80.

"Tanjikan dosa kijutsu wo mochiita eizo no scene hyogen to kensaku hoshiki no kento", Wataru Miyamori et al., Technical Research Report, The Institute of Electronics, Information and Communication Engineers, vol. 98, No. 527, pp. 107-114.

"GMRF to optical flow wo riyo shita sakka eizo no object chushutsu", Echigo, Proceedings of Symposium, Information Processing Society of Japan, vol. 98, No. 10, pp. I.443-I.448.

"Method For Searching Moving Picture With Change Of State Over Time As Key", Abe et al., pp. 512-519, 1992.

"An Automatic Video Parser For TV Soccer Games", Gong et al., ACCV '95, pp. 509-513.

"Integrated Image And Speech Analysis For Content-Based Video Indexing", Chang et al., ICMCS '96, pp. 306-313.

"Analysis And Presentation Of Soccer Highlights From Digital Video", Yow et al., ACCV '95, pp. 499-502.

A Suggestion Of A Method For Image Search By Inquiries Using Words Of Movement, Miyamori et al., Image Media Processing Symposium '96.

"Method For Image Contents Search Using Description Of Short Time Movement In A Scene", Miyamori et al., MIRU-98.

"On The Simultaneous Interpretation Of Real World Image Sequences And Their Natural Language Description: The System SOCCER", Andre et al., Proc. 8th ECAI.

"Automatic Classification Of Tennis Video For High-Level Content-based Retrieval", Sudhir et al., Proc. CAIVD-98, pp. 81-90, 1997.

"Study of scene representation and retrieval of video using short-time action descriptions", Hisashi Miyamori et al., IBM Research, 10 pages.

* cited by examiner

METHOD AND DEVICE FOR DESCRIBING VIDEO CONTENTS

FIELD OF THE INVENTION

The present invention relates to a method and an apparatus for describing contents of motion picture for the sake of efficient search based on contents of motion picture of a computer system capable of processing motion picture, in particular, video, DVD and so on.

BACKGROUND ART

While motion picture such as video data is easy for a human being to understand, there was a difficulty for a computer to manage it. Namely, it is difficult to find the meaning that the contents have from an original video data itself, and it has not been possible to date to accurately represent the meaning of video data even with advanced image processing technology.

While management of motion picture such as video data with a computer was conventionally based on annotations made by an administrator in advance, the method of using annotations lacks consistency in annotations among administrators, and besides, complicated processing for video data in large quantities is a big problem from now on.

As a candidate for the solution, it is considered promising to describe metacontents from video data with an intermediate result of image processing and knowledge registrable in advance that the contents have.

However, though it is possible to use plural image features for specific contents so as to describe a description method or a search engine for specific search or management, general versatility is lost and it does not contribute to proliferation of video search.

Therefore, a description method with general versatility taking advantage of image features is desired for description of video data, and the activities for standardization were started by ISO (International Organization for Standardization) as MPEG-7.

MPEG (Moving Picture Experts Group) is an organization promoting standardization of encoding method for storing color motion picture, and MPEG-1, MPEG-2 and MPEG-4 have been standardized so far.

Since MPEG-7 has no rule for a method of image processing and is beyond the scope of any standards, not only automatic processing but also manual data input is allowed.

However, it will only make data input more complicated to demand meaning of originally unextractable scene from video data or registration of data difficult to detect from video data. So far, there have been many examples of representing frame sequence of video as structured. For instance, Abe's method ("Method for Searching Moving Picture with Change of State over Time as Key", Abe, Sotomura, Shingakuron, pp. 512–519, 1992 (conventional example 1)) describes a dynamic change of state so that the time intervals to be searched in video search may not be fixed.

In Abe's method (conventional example 1), however, since information of state description covers the entire frames, a drawback is that search time is in proportion to length of the video used for search. Also, since an object is represented by the center of gravity in an image, it is substantially different from the present invention taking advantage of changes in an object's shape.

While the method described in conventional example 2, ("An Automatic Video Parser for TV Soccer Games," Y. Gong, C. H-Chuan, L. T. Sin, ACCV '95, pp. 509–513, November, 1995) is trying to use information of positions and movement of the players, the positions are classified code of positions where the field is roughly divided into nine, and movement is of a very short period (several frames) so that event extraction is performed regarding classified code of positions and motion vector in a short period as events.

In conventional example 2, however, a drawback is that an event to be extracted and description are inseparable and besides, extractable events become a very limited set.

The method described in conventional example 3, ("Integrated Image and Speech Analysis for Content Based Video Indexing," Y -L. Chang, W. Zeng, I. Kamel, R. Alonso, ICMCS '96, pp. 306–313, 1996) adopts a limited approach of tracking positions of the ball and goal posts on the screen and considering only their positional relationship so as to extract time intervals of close distance as exciting scenes.

The method described in conventional example 4, ("Analysis and Presentation of Soccer Highlights from Video," D. Yow, B. L. Yeo, M. Yeung, B. Liu, ACCV '95, pp. 499–502, 1995) performs shot extraction covering American football, and identifies events such as touchdown by a key word in each shot by speech recognition and line pattern extraction in the screen using image processing.

However, neither conventional example 3 nor 4 has a concept such as a player and his movement.

On the other hand, while there is also conventional example 5, ("A Suggestion of a Method for Image Search by Inquiries Using Words of Movement," Miyamori, Kasuya, Tominaga, Image media processing symposium '96, I-8, 13, 1996) as a method for representation which cuts an object from video and is based on lifetime and an object position, it has neither a concept of reference plane nor general versatility.

In addition, conventional example 6, ("A Suggestion of a Method for Image Contents Search Using Description of Short Time Movement in a Scene," Miyamori, Maeda, Echigo, Nakano, Iisaku, MIRU-98, I-75, 1998) also describes an object with description of short time movement as a unit, but it lacks expandability since it does not simultaneously adopt description which represents a spatio-temporal trajectory and is a representation method dependent on specific contents.

Conventional example 7, ("On the Simultaneous Interpretation of Real World Image Sequences and Their Natural Language Description: The System SOCCER," E. Andre, G. Herzog, T. Rist, Proc. 8th ECAI, pp. 449–454, 1988) is a system with scene description and interaction among objects as its meta data. However, the purpose of the system of conventional example 7 is conversion of medium from image to speech, namely a system for automatically generating a narration, so it does not store the created meta data and unlike the present invention, it does not have a data structure suitable for search of contents.

Conventional example 8, ("Automatic Classification of Tennis Video for High-level Content-based Retrieval," G. Sudhir, J. C. M. Lee, A. K. Jain, Proc. CAIVD-98, pp. 81–90, 1997) covers tennis matches, so description of interaction among objects is limited to simple movement and position information.

The present invention is limited, in terms of its descriptive contents, to processing results based on "feature colors," "texture," "shape" and "movement."

In video, a subject of attention is different depending on its contents. Therefore, it is necessary to predefine a subject object depending on the contents.

An object defined here consists of a lump region appearing in image, and it is possible to extract its color, texture, shape and movement.

It is a property of this object region that can be extracted from video, and it is difficult to give meaning to its contents.

Accordingly, a technique of description based on relationship between a single object and plural objects is proposed, and knowledge dependent on contents registrable in advance and description of objects are associated, and thus, search based on an object of a meaningful scene in video becomes possible.

Since description of the entire frames of video data will result in storing of redundant information in large quantities, description for efficiently representing video contents with a little data volume is important.

The present invention is a proposal of a description method effective for interpretation based on video contents. The description method of the present invention is effective not only for search of an object or a scene but also for applications such as reuse of an object and summarization of contents.

An object of the present invention is to provide a description method for efficiently representing contents of motion picture with a little data volume.

Another object of the present invention is to propose a description method effective for interpretation based on contents of motion picture.

A further object of the present invention is to provide a description method not only for search of an object or a scene but also capable of applications such as reuse of an object and summarization of contents.

SUMMARY OF THE INVENTION

The present invention proposes a method for description in terms of relationship between a single object and plural objects based on data extractable as an image feature.

Namely, the present invention (1) represents a trajectory of how each object has moved over time by using reference plane representing position information of each object, (2) sets a description unit based on a type of action of each object by using changes in shape of each object, (3) has actions of each object represented as each behavioral section, and (4) comprises a description facility capable of reading and interpreting definition of an object dependent on video contents, definition of classes of actions, and definition of interpretation of a scene by interaction of plural objects.

PREFERRED EMBODIMENTS

As main features of an object in image, there are "position" of an object, its "moving speed" and "trajectory."

However, in spite of conventional use of "position" information, position in description of video is mostly mere implicit use of an image plane, and there is no method for using a different ground from the image plane depending on the contents.

In addition, an image is originally a three-dimensional scene projected on a two-dimensional plane, and there are cases where it is more convenient to take an object position not on an image plane but on a plane on which the object exists.

In general, sports images just fall under the cases where it is more convenient to take an object position not on an image plane but on a plane on which the object exists.

While a plane equivalent as world coordinates system is generally used for description of an object of the real world, it is different from video in the subject of description, purpose and in that it always takes the ground for a part of the real world.

On the other hand, since an image lacks information of a depth direction, it may be better to project consecutive frames of video on a common image plane.

From the above consideration, it is necessary to predefine for each of the contents to be searched the ground for determining an object position which is called reference plane and described as follows by using "zone description" and a "camera model."

This description method allows effective description for the contents to which a geometrical relationship among objects is important.

Descriptions of reference plane, zone description and camera spec. are shown in attached Table 1. However, the description of camera spec. is not essential to the present invention but optional.

Next, representation method for each object is explained. An object moves on reference plane and performs meaningful behavior/actions in it.

For the contents in which behavior of an object may be a major factor in hitting the search, specifically the following description method is very effective.

A representation unit of an object is decomposed on the basis of behavior, and initiating and terminating frames representing its behavioral section and a trajectory between them are described so as to reproduce an object position in an arbitrary frame.

While nothing represented changes in shape of each object in the background art, the present invention allows meaning of an object of a description unit to be preserved by giving meaning to changes in shape as behavior of an object due to such changes in shape.

This description is represented as Action (or described as Act) shown in attached Table 2.

An example of description using this Action is as follows.

Act("Kick", 10(frame), 240(frame), 3, 3, (120, 180, 0) (150, 195, 180) (180, 223, 230))

By this description of Action, a representation of "An object (who) did the behavior indicated by action ID (what) on the space represented by a trajectory (where) in a time interval (when)" becomes possible.

Here, collinear approximation is used as a method for representing a trajectory. Data of a trajectory is collinearly approximated, and the number of nodes, approximated coordinates on reference plane of each node and the time in Action are described. Consequently, if a certain time is specified, coordinate value of an object at the time can be uniquely determined.

Figure 1:
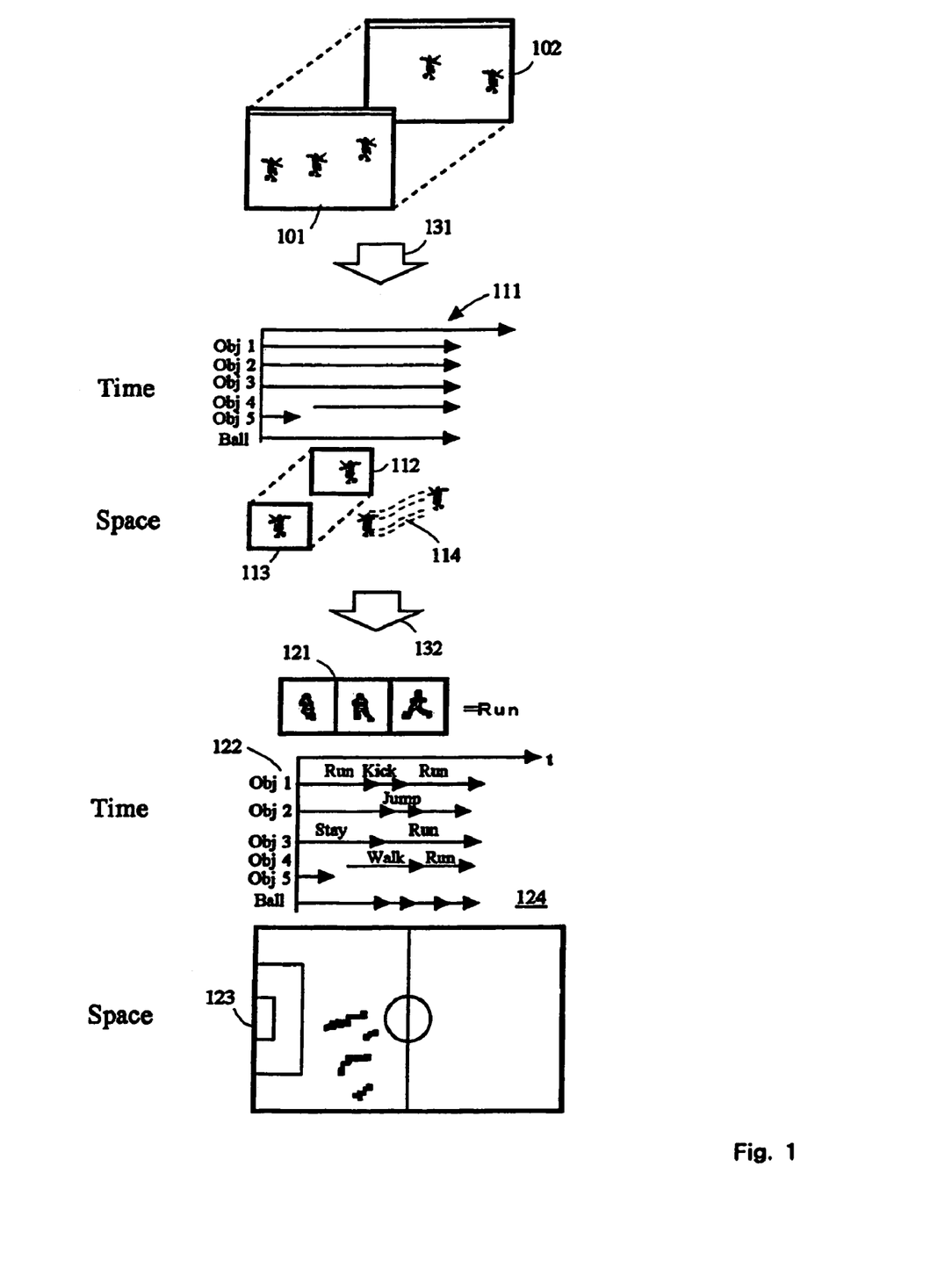
FIG. 1 is a diagram showing cutting of video data on a computer to which the present invention is applied.

FIG. 1 is a diagram conceptually representing description based on reference plane and a behavioral section of an object and description and data flow based on plural objects in soccer contents.

First, a video object based on the region is cut from video sequence, and lifetime of the object is acquired by tracing each object in the direction of time (131). Next, actions of the object are classified based on silhouette of the object which represents changes in shape of each object. Description of objects is performed for each of these behavioral sections, which is Action description (132).

At this time, spatial movement of the object is represented as its trajectory by using reference plane. Objects present in the entire frames of video have Action description independently, and IAction (described later) is defined from plural objects.

For simplicity, a trajectory in Act is described here limiting it only to that of two points. In addition, a trajectory of a ball is used as to spatial representation of IAct (described later). And in this case, information of a ball is described with a player's touch on a ball (kicking or receiving a ball) as a unit, regarding a touch between different players as a pass and a consecutive touches by the same player as a dribble.

If FIG. 1 is seen further in detail, a region bases on color, texture and movement is cut from video sequence 101 and 102 (112 and 113). While this process is basically automated, it is also possible to modify it in each field by a tool for correcting regions extracted erroneously and oversplit regions.

Hereafter, the split moving regions are handled as video objects. Also, an object ID can be inserted at this time. Tracing of a region between neighboring fields (114) is automatically determined by a size of the region where split regions are overlapping. A ball, as a special object, is not currently cut, and manual input is performed with a tool for inputting a position of a ball on an image. 111 in FIG. 1 shows a conceptual diagram of he above data.

Next, a camera movement parameter is restored by tracing in each field a corner or a feature region on a still object in the background.

Position of a video object is represented on an image plane, which requires correction according to movement of a camera. Therefore, a virtual plane is assumed and the video of which a movement parameter is restored is projected on an image plane. Thus, data equivalent to restoring an object position in video which is input from a single camera is acquired. Moreover, since the camera is set to have an angle of depression against the ground, it can be handled not as a distance on an image plane but as a real distance by projecting the object position on the plane of the ground looked down on from the sky as reference plane. This is represented in Space 123 in FIG. 1 as a conceptual diagram which is continuous with time.

While the cut object is a video changing shape over time, in this example, a silhouette disregarding internal color information is used in order to pay attention to changes in shape. Since changes in silhouette show specific changes according to actions, consecutive silhouettes of plural pre-instructed action patterns are unfolded in unique space so as to acquire changes unique to actions from high order eigenvalue.

Next, when input patterns are unfolded in the same unique space, the movement patterns are identified by seeking which instructed patterns they are closest to (121). This process requires a changing point in actions in a series of object actions to be acquired. While it is possible to acquire the changing point from the unique space, it is currently entered manually.

A series of objects can be described by plural actions, and just by entering an action ID and a frame number at a changing point in actions, it can be interpreted that all the objects in between were performing the same movements. 122 in FIG. 1 shows a conceptual diagram of the above data.

As above, while the data transformation described in FIG. 1 has processing which partly needs manual input support, it is possible to generate data in a process which is expected to be automated in the future.

Figure 2:
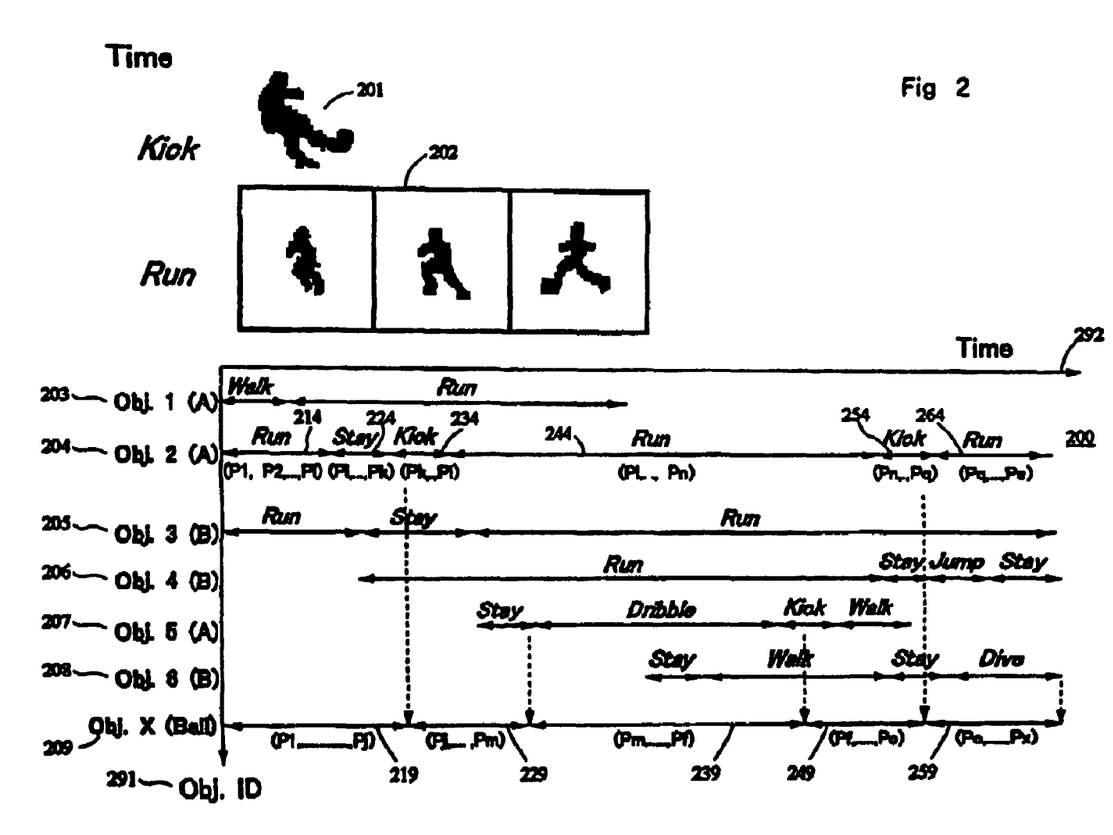
FIG. 2 is a diagram showing that position information and actions are assigned to a behavioral section of each object to which the present invention is applied.

FIG. 2 is a diagram showing in detail the same drawing as TIME (124) in FIG. 1, but the subject video data is different.

Horizontal axis 292 in FIG. 2 represents time, and vertical axis 291 represents an object ID.

An object is described making the changing points of time of silhouettes 201 and 202 in FIG. 2 boundaries of description with an identified action ID as a minimum unit. The time intervals and object positions at the start/end of an action ID are described. Also, in order to trace an object trajectory, positions at plural points in a time interval are described. Accordingly, object positions can be approximated in all the frames.

200 in FIG. 2 is a conceptual diagram of objects according to the time intervals where Objs. 1–6 (203–208) represent the players, (A) and (B) represent the teams, and Obj. X (209) represents the ball.

For instance, Obj. 2 (A) is a player of team A and it runs during time interval 214, stays in time interval 224, kicks a ball in time interval 234, runs in time interval 244, kicks a ball in time interval 254, and runs in time interval 264. These actions are recorded with starting time, ending time and an object position (Px).

Ball 209 is described as an object without an action ID. It moves from P1 to Pj during time interval 219, from Pj to Pm during time interval 229, from Pm to Pf during time interval 239, from Pf to Po during time interval 249, and from Po to Px during time interval 259.

Figure 3:
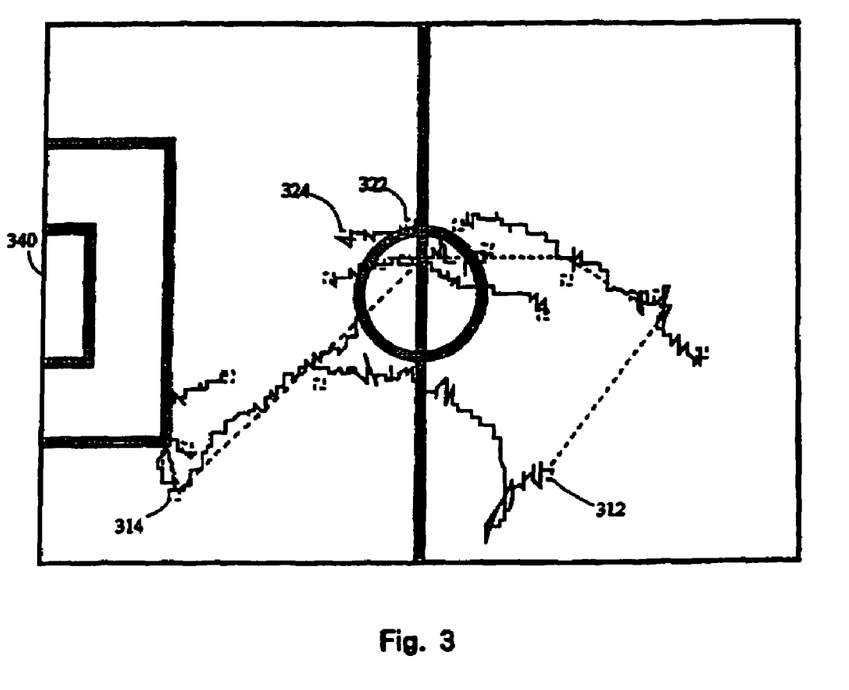
FIG. 3 is a diagram showing a trajectory on reference plane of each object to which the present invention is applied.

FIG. 3 shows movement of major players in the soccer scene for about 20 seconds in a solid line and movement of a ball in a dotted line. While FIG. 3 is a diagram showing in detail the same drawing as Space (123) in FIG. 1, but the subject video data is different.

These are the cases where the objects were extracted from the actual soccer scene and then the movement of each object on the field was reproduced by automatically extracting movement parameters of the camera. In the case of FIG. 3, a soccer field is set as reference plane.

The ball object (dotted line) is kicked first from position 312 and reaches position 314 near goal 340 after being kicked several times.

It shows that a player (solid line) has moved from position 322 to position 324 and another player has started from position 312 and moved to position 314.

In this way, a trajectory of each object in the video data on reference plane can be traced.

Next, while in general, plural objects simultaneously exist in an image and have different lifetimes and meanings respectively, it becomes possible to give meaning to a scene consisting of behavior of plural objects.

This is described as Interactive Action (IAction). IAction (or described as IAct) is totally dependent on contents, and a different definition for each content or for each video database administrator may be used.

However, in order to facilitate consistency of description of IAction and its application to a search engine, it is prescribed in this specification that IAction is defined by logical operation with another IAction and plural Actions. Description of IAction is shown in attached Table 3.

An example of description using this IAction is as follows. IAct("Pass", 20(frame), 35(frame), 2, 1, 2, Trajectory, 2, (120, 180, 0) (160, 230, 15))

The above description of IAction is a description of "when, where, who did what." The differences from the above Action are that its subject is plural objects and that the location is specified in a voluntary manner.

In the example of soccer mentioned later, a trajectory of a ball is used as spatial representation of an event.

As an example, descriptions of a "Pass" to which meaning is given by two objects and a "Through Pass" represented by AND of other objects are explained.

Here, it is assumed that the database described by the above Act and IAct actually exists. It is defined for convenience sake that a through pass is "a pass made between players A and B, and the ball went through between players C and D of the defense side who were there at the time the pass was made."

In the present invention, it is defined as to determine the following. 1. There was an IAct ("pass") between certain two players. 2. There were two other players of the defense side in that time interval (there are two Acts sharing a time interval with 1, and the object which performed the two Acts belongs to a different team from the objects of 1). 3. The trajectory of the pass went through between the two players (in the shared time interval, the trajectory of the ball intersects the line linking the two players of the defense side).

Here, the IAct statement is described in attached Table 4.

An example of definition of an IAct through pass is shown in attached Table 5.

As an example of application of the present invention, description in a soccer game is shown. In soccer, a type of play defined from a single object and a type of actions defined by relationship of plural objects are used as description items. Moreover, in soccer, description of a ball object is used as a special object.

Description of a ball itself can be represented likewise, namely an action ID is omitted in the Action description of the above object and the object ID is a ball.

The following description defines IAction in soccer contents, and description using Action and IAction is also possible to other contents.

It can be considered a useful description method for the contents such as the present invention in which representation of behavior of an object and positional relationship on reference plane is effective, since there are a number of examples of application such as sports other than soccer, measurement of traffic and video surveillance, etc.

Here, a ball object is described as follows.

ball (StartTime, EndTime, number of Nodes, Trajectory)

There are the following types of actions of a single object used in soccer.

Activity={lie, sit, fall_down, raise_hand, dive, hand_throw, throw_in, jump, stay, walk, run, sliding, kick, overhead_kick}

Namely, lie, sit, fall_down, raise_hand, dive, hand_throw, throw_in, jump, stay, walk, run, sliding, kick, overhead_kick, and so on can be considered in general.

As examples of actions, a pass (lines 1 to 26 in Table 6), a long pass (lines 28 to 39 in Table 6), a feed pass (lines 1 to 14 in Table 7), a cross pass (lines 16 to 33 in Table 7), a gain pass (lines 1 to 18 in Table 8), centering (lines 20 to 38 in Table 8), and a wall pass (lines 1 to 36 in Table 9) are described.

As definition of a through pass as an example of IAct was already explained in detail referring to Table 5, detailed explanation of these examples is not given here.

In addition, the groups of auxiliary functions used in IAct are shown in attached Tables 10 and 11. See the groups of auxiliary functions for the meanings of the functions used in the above examples (see attached Tables 6 to 9).

Figure 4:
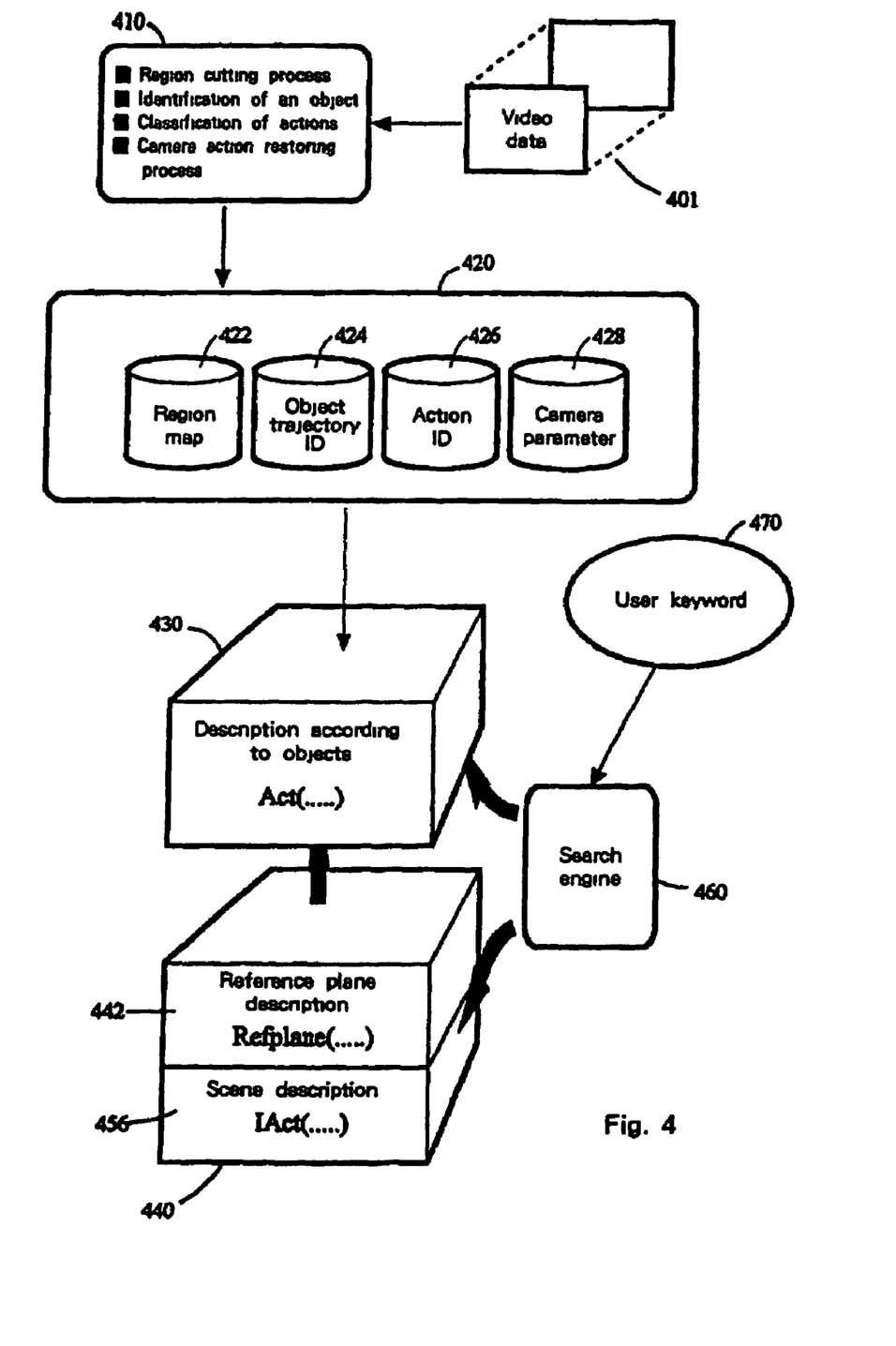
FIG. 4 is a diagram showing an outline of a processing flow of video data on a computer to which the present invention is applied along with its main components.

FIG. 4 shows the steps necessary for searching video data and related data groups (see attached Tables 10 and 11). Video data 401 is processed by image processing 410 and the results are stored as data groups of 420. For instance, region map 422 is acquired from a region cutting process, an object trajectory ID (424) from identification of an object, an action ID (426) from classification of actions, camera parameter 428 from camera action restoring process, etc. However, these processes are not only completely automated processes but also the cases of formatting data with manual support after generation and manually inputting as data directly from video data 401.

From these data groups of 420, Act 430, namely video description according to the objects is obtained.

Also, from the definition obtained in advance by selecting video data 401, description of reference plane (Refplane) 442 for video data 401 is obtained.

Furthermore, by selecting video data 401, scene description IAct 456 describing meaning given to a scene consisting of behavior of plural objects is obtained, which is predefined for interpreting video data 401.

As an application of this description, to search video data 401, a user will enter user keyword 470 to search engine 460. Search engine 460 interprets user keyword 470 and returns a time interval of corresponding video data 401 from object description 430 and scene description 456 to display on video to the user.

At this time, scene description 456 returns a corresponding time interval by processing Refplane 422 and Act 430.

Moreover, a user is allowed a description equivalent to scene description IAct 456 for search engine 460, and Refplane 422 and Act 430 are processed for a user-defined scene description so that a time interval of a user-defined scene is returned and displayed on video to the user.

Figure 5:
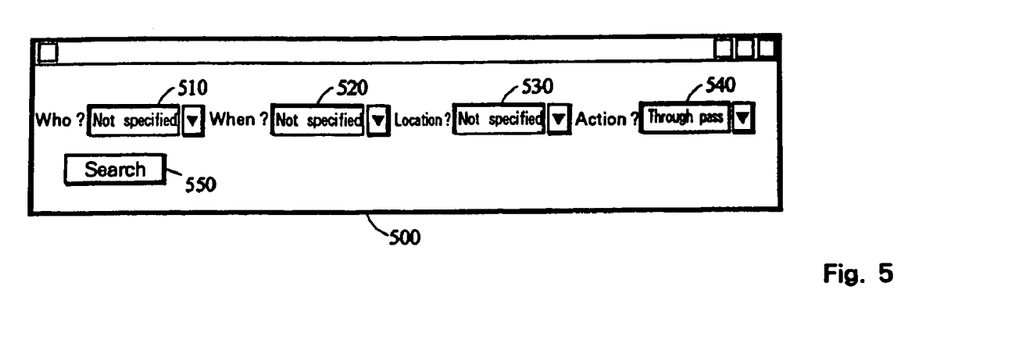
FIG. 5 is a diagram showing a search screen of the present invention.

FIG. 5 shows a screen for searching video.

It is possible for a user to search a desired scene by selecting a necessary item in search screen 500 and by starting search 550.

In the case of a soccer video explained so far, it is possible to perform specification of players 510, specification of time 520, specification of location (place) 530, and specification of action 540.

As to specification of players, it is thinkable to specify them by team name, individual name or position.

In the case of specification of action, it is possible to use the actions defined in the above-mentioned Action and IAction. For instance, it is possible to use Actions such as lie, sit, fall_down, raise_hand, dive, hand_throw, throw_in, jump, stay, walk, run, sliding, kick or overhead_kick, or IActions such as a pass, a through pass or a centering. Moreover, a user may also newly define a scene.

Figure 6:
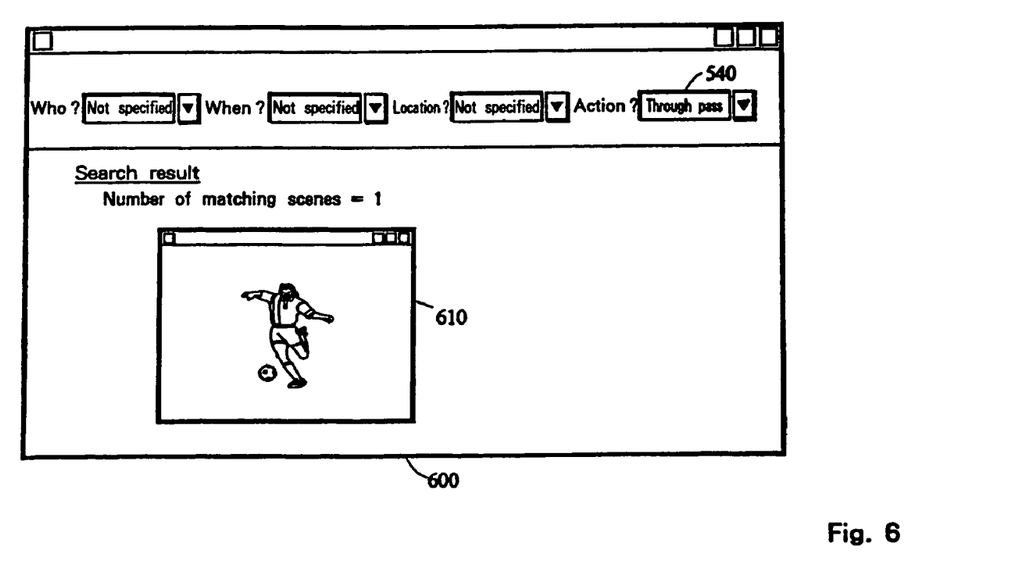
FIG. 6 is a diagram showing a search result of the present invention.

FIG. 6 shows screen 600 of a search result of a scene in the case of specifying a through pass for an action in FIG. 5.

For instance, the search result in this case is one, and image 610 at the start of the scene is displayed. Generally, a desired scene is replayed by clicking this image 610 of the search result.

ADVANTAGES OF THE INVENTION

It is possible, by adopting the above-mentioned organization of the present invention, to provide a description method for effectively representing contents of motion picture with a small data volume.

Also, a description method effective for interpretation based on contents of motion picture becomes possible by adopting the organization of the present invention.

Furthermore, it becomes possible, by adopting the organization of the present invention, to provide a description method of motion picture capable of applications such as reuse of an object and summarization of contents in addition to search for an object or a scene.

As a summary, other embodiments are described below.

A description means for contents of motion picture, the means comprising of:

(a) means for setting reference plane;

(b) means for describing each object on the motion picture by position on the reference plane and predefined type of actions; and (c) means for describing each scene by using the means for describing each object.

A search means for contents of motion picture, the means comprising of:

(a) means for setting reference plane;

(b) means for describing each object on the motion picture by position on the reference plane and predefined type of actions;

(c) means for describing each scene by using the means for describing each object; and (d) means for searching motion picture by using the means for describing each object or the means for describing each scene.

A description method for motion picture, the method comprising the steps of:

(a) determining reference plane which represents information of object positions included in the motion picture;

(b) representing changes over time of each object on the reference plane as a trajectory;

(c) setting a description unit based on predefined type of actions of each object by using changes in shape of each object so as to assign actions of each object as each behavioral section; and (d) defining each scene by plural objects.

A search method for motion picture, the method comprising the steps of:

(a) setting reference plane which represents information of object positions included in the motion picture;

(b) representing changes over time of each object on the reference plane as a trajectory;

(c) setting a description unit based on predefined type of actions of each object by using changes in shape of each object so as to assign actions of each object as each behavioral section;

(d) defining each scene by plural objects; and (e) searching a specific scene by using the actions of each object or the scene.

A description method for motion picture, the method comprising the steps of:

(a) determining reference plane from the motion picture;

(b) cutting a region map, an object trajectory ID, an action ID and a camera parameter from the motion picture;

(c) creating description of actions by each object from the region map, the object trajectory ID, the action ID and the camera parameter; and (d) creating description of scenes by using the description of actions by each object.

A description method for motion picture, the method comprising the steps of:

(a) determining reference plane from the motion picture;

(b) cutting a region map, an object trajectory ID, an action ID and a camera parameter from the motion picture;

(c) creating description of actions by each object from the region map, the object trajectory ID, the action ID and the camera parameter; and (d) creating description of scenes by using the description of actions by each object.

A description method for motion picture, the method comprising the steps of:

(a) cutting a region map, an object trajectory ID, an action ID and a camera parameter from the motion picture;

(b) creating description of actions by each object from the region map, the object trajectory ID, the action ID and the camera parameter; and (c) creating description of scenes by using the description of actions by each object.

A computer readable storage medium which has recorded management data for searching motion picture, the management data comprising of:

(a) data of description of actions by each object defined by position on reference plane and predefined type of actions; and (b) data of description of scenes defined by the data of description of actions.

A computer readable storage medium which has recorded a program, the program having a computer execute the steps of:

(a) determining reference plane which represents information of object positions included in the motion picture;

(b) representing changes over time of each object on the reference plane as a trajectory;

(c) setting a description unit based on predefined type of actions of each object by using changes in shape of each object so as to assign actions of each object as each behavioral section; and (d) defining each scene by plural objects.

DESCRIPTION OF THE SYMBOLS

401: Video data
410: Image processing
420: Data groups

422: Region map
424: Object trajectory ID
426: Action ID
428: Camera parameter
430: Act description
442: Reference plane description
456: IAct description
460: Search engine
470: User keyword

TABLE 1

Description of Reference plane:

Reference plane:: = Model of the ground

| | | |
|---|---|---|
| <Ref ID> | text | Name of reference plane |
| <Plane> | cordinates | Center of the Area (e.g. (0,0)) |
| <Metric> | array of numeric | define transformation (e.g. 3 × 3 matrix for Affine transformation) |

Description of Zone Description:

Zone Description:: = Define meaningful space on the ground

| | | |
|---|---|---|
| <Zone ID> | text | Identified the zone on the ground (e.g. Goal, Center line) |
| <Space> | space desc | define the space on the ground |

Description of Camera Spec (option):

Camera Spec:: = Define camera model

| | | |
|---|---|---|
| <Camera Type> | text | Identify camera model |
| <Param Array> | array of numeric | define model transformation |

TABLE 2

Description of Action:

Acrion:: Describe single player's action

| | | |
|---|---|---|
| <Action ID> | text | Action Symbol (e.g. Run, Kick Walk, etc) (text representing types of actions) |
| <T-Interval> | time interval | Time Interval of this action (represented by starting and ending times) |
| <Object ID> | numeric | Object Identifier (object of this action) |
| <Trajectory> | Time Stamped Polyline (a line with a time attribute of each node) | Trajectory of the player in this action (trajectory of an object on reference plane in the time interval of this action) |

TABLE 3

Description of IAction:

IAction:: = Meaningful event in the domain, composed of multiple players and ball

| | | |
|---|---|---|
| <IAction ID> | text | Event Symbol (e.g. Shot, Pass, Through Pass, etc) (text representing types of events) |
| <T-Interval> | time interval | Time interval of this action |
| <No of Object> | numeric | Number of Objects |
| <Object ID> | array of numeric | Array of Objects identifier |
| <Space> | Trajectory Polylines, Polygons | Spatial description of this action |

TABLE 4

Definition of IAct:

begin
  Definition of IAct
  A list of an IAct, a child Act and a child ball (a child IAct and a child Act, etc. mean an IAct and an Act comprising this IAct)
where
  [All the judgment parts and judgment statements with auxiliary functions are linked by AND]
fill
  [An element assignment part of a defined IAct]
end Here, variable symbols in a define statement have respective types which are represented by a first character of each variable. The types are as follows.

| Type | Description |
|---|---|
| f | a frame |
| t | a time interval (consisting of starting and ending frames) |
| o | an object |
| O | a group of objects (consisting of a set of objects and the number of them) |
| p | a point (consisting of spatial component x and y) |
| P | a group of points (consisting of a set of points and the number of them) |
| A | a group of points, which means a polyline linking them |
| I | a time point (consisting of spatial component x, y and time component t) |
| L | a group of time points (consisting of a set of time points and the number of them) |
| i | an integer |
| d | a real number |

TABLE 5

| Line | Define statement | Description |
|---|---|---|
| 1 | begin | Beginning. |
| 2 | iact Through_pass t0 O0 L0 | Here, it defines an Iact "Through Pass". |
| 3 | child_iact 1 pass t1 O1 L1 | Iact pass as one comprising this Iact. |
| 4 | child_act 3 Stay Walk Run t2 o2 false L2 | And an Act of defense side player 1 (it means that a with object ID o2 (Stayed, Walked or Ran) moving on trajectory L2 during time interval t2). |
| 5 | | |
| 6 | child_act 3 Stay Walk Run t3 o3 false L3 | An Act of defense side player 2. |
| 7 | where | |
| 8 | greater_than o2 o3 | Two players of the defense side have different object IDs (their IDs are o2, o3). |
| 9 | get_object_from_GO o4 1 O1 | Take the first player of Iact ("Pass") to put in variable o4. |
| 10 | not_same_team o4 o2 | o4 and o2 are different teams. |
| 11 | not_same_team o4 o3 | o4 and o3 are different teams. |
| 12 | set_length_of_polyline d0 L1 | Length of a pass is measured. |
| 13 | less_than d0 20.0 | Length of 20 m or less. |
| 14 | temporal_overlap t2 t3 | Two players of the defense side have overlapping time intervals. |
| 15 | set_temporal_overlapping_period t4 t2 t3 | The overlapping time intervals to variable t4. |
| 16 | temporal_overlap t1 t4 | There is an overlap in time intervals of t4 and an Iact pass. |
| 17 | set_temporal_overlapping_period t5 t1 t4 | Overlapping time intervals (consequently, overlapping Acts and Iact passes of the two players of the defense side) to variable t5. |
| 18 | get_frame_start_of_period f0 t5 | Put a starting frame of time interval t5 in time point of. |

TABLE 5-continued

| Line | Define statement | Description |
|---|---|---|
| 19 | get_frame_start_of_period f1 t5 | Put a starting frame of time interval t5 in time point f1. |
| 20 | set_ST_GL_dividing_point p0 L2 f0 | The position (location) of player 1 of the defense side at time point f0 to variable p0. |
| 21 | set_ST_GL_dividing_point p1 L3 f0 | The position (location) of player 2 of the defense side at time point f0 to variable p1. |
| 22 | set_ST_GL_dividing_point p2 L2 f1 | The position (location) of player 1 of the defense side at time point f1 to variable p2. |
| 23 | set_ST_GL_dividing_point p3 L3 f1 | The position (location) of player 1 of the defense side at time point f1 to variable p3. |
| 24 | get_point_from_polyline p4 1 L1 | The starting point of a pass to p4. |
| 25 | get_point_from_polyline p5 −1 L1 | The ending point of a pass to p5. |
| 26 | Create_line P1 2 p4 p5 | Create a line linking p4 and p5 (a pass course). |
| 27 | Create_line P2 2 p0 p1 | A line linking p0 and p1 (a line linking the two players of the defense side at time point f0). |
| 28 | Create_line P3 2 p2 P3 | A line linking p2 and p3 (a line linking the two players of the defense side at time point f1). |
| 29 | spatial_cross P1 P2 | P1 and P2 are crossing. |
| 30 | set_distance_point_and_line d1 p0 p4 p5 | The distance from pass course p0 at time f0 is sought. |
| 31 | set_distance_point_and_line d2 p1 p4 p5 | The distance from pass course p1 at time 0f is sought. |
| 32 | less_than d1 7.0 | The distance is 7 m or less. |
| 33 | less_than d2 7.0 | Same. |
| 34 | spatial_cross P1 P3 | P1 and P are crossing. |
| 35 | set_distance_point_and_line d3 p2 p4 p5 | The distance from a pass course at time point f1 is sought as above. |
| 36 | set_distance_point_and_line d4 p3 p4 p5 | |
| 37 | less_than d3 7.0 | The distance is 7m or less. |
| 38 | less_than d4 7.0 | |
| 39 | fill | If the above conditions are met, |
| 40 | t0 t1 | Assign the time interval of t1 (Iact pass) to t0 (the time interval of an Iact through pass). |
| 41 | O0 O1 | Assign the group of objects of O1 (Iact pass) to O1 (the group of objects of an Iact through pass). |
| 42 | L0 L1 | Assign L1 (a trajectory of Iact pass) to L0 (spatial representation of Iact through pass). |
| 43 | end | End. |

TABLE 6

| Line | Define statement |
|---|---|
| 1 | pass: |
| 2 | begin |
| 3 | Iact Pass t0 O0 L0 |
| 4 | Child_act Kick|Jump|Sliding t1 o1 L1 |
| 5 | Child_act Run|Stay|Walk t2 o2 L2 |
| 6 | Ball t3 L3 |
| 7 | where |
| 8 | same_team(o1,o2) |
| 9 | get_frame_start_period f1 t3 |
| 10 | get_frame_end_period f2 t3 |
| 11 | temporal_overlap t1 t3 |
| 12 | temporal_overlap t2 t3 |
| 13 | set_ST_GL_dividing_point p1 f1 L3 |
| 14 | set_ST_GL_dividing_point p2 f2 L3 |
| 15 | set_ST_GL_dividing_point p3 f1 L1 |
| 16 | set_ST_GL_dividing_point p4 f2 L2 |
| 17 | set_distance_point_to_point d1 p1 p3 |
| 18 | set_distance_point_to_point d2 p2 p4 |

TABLE 6-continued

| Line | Define statement |
|---|---|
| 19 | Less_than d1 0.5 |
| 20 | Less_than d2 0.5 |
| 21 | set_Go_from_objects O1 2 o1 o2 |
| 22 | fill |
| 23 | t0 t3 |
| 24 | L0 L3 |
| 25 | O0 O1 |
| 26 | End |
| 27 | |
| 28 | long pass: |
| 29 | begin |
| 30 | iact Long_pass t0 O0 L0 |
| 31 | child_iact Pass t1 O1 L1 |
| 32 | where |
| 33 | set_length_of_polyline d0 L1 |
| 34 | Greater_Than d1 30.0 |
| 35 | fill |
| 36 | t0 t1 |
| 37 | O0 O1 |
| 38 | L0 L1 |
| 39 | end |

TABLE 7

| Line | Define statement |
|---|---|
| 1 | feed pass: |
| 2 | begin |
| 3 | Iact Feed Pass t0 O0 L0 |
| 4 | Child_Iact Pass t1 O1 L1 |
| 5 | Child_act Run t2 o2 L2 |
| 6 | where |
| 7 | get_object_from GO o3 −1 O1 |
| 8 | same_object o2 o3 |
| 9 | temporal_during t1 t2 |
| 10 | fill |
| 11 | t0 t1 |
| 12 | O0 O1 |
| 13 | L0 L1 |
| 14 | end |
| 15 | |
| 16 | cross pass: |
| 17 | begin |
| 18 | Iact Cross pass t0 Oo L0 |
| 19 | Child_Iact Pass t1 O1 L1 |
| 20 | where |
| 21 | get_frame_start_period f1 t1 |
| 22 | get_frame_end_period f2 t1 |
| 23 | set_ST_GL_dividing_point p1 f1 L1 |
| 24 | set_ST_GL_dividing_point p2 f2 L1 |
| 25 | set_length_of_polyline d1 L1 |
| 26 | set_X_distance_point_and_point d2 p1 p2 |
| 27 | greater_than d1 30.0 |
| 28 | less_than d2 5.0 |
| 29 | fill |
| 30 | t0 t1 |
| 31 | O0 O1 |
| 32 | L0 L1 |
| 33 | end |

TABLE 8

| Line | Define statement |
|---|---|
| 1 | gain pass: |
| 2 | begin |
| 3 | Iact Gain_pass t0 O0 L0 |
| 4 | Child_Iact Pass t1 O1 L1 |
| 5 | where |

TABLE 8-continued

| Line | Define statement |
|---|---|
| 6 | get_frame_start_period f1 t1 |
| 7 | get_frame_end_period f2 t1 |
| 8 | set_ST_GL_dividing_point p1 f1 L1 |
| 9 | set_ST_GL_dividing_point p2 f2 L1 |
| 10 | set_length_of_Polyline d1 L1 |
| 11 | set_Y_distance_point_and_point d2 p1 p2 |
| 12 | greater_than d1 30.0 |
| 13 | less_than d2 5.0 |
| 14 | fill |
| 15 | t0 t1 |
| 16 | O0 O1 |
| 17 | L0 L1 |
| 18 | end |
| 19 | |
| 20 | centering: |
| 21 | begin |
| 22 | Iact Cross pass t0 O0 L0 |
| 23 | Child_Iact Pass t1 O1 L1 |
| 24 | where |
| 25 | get_frame_star_period f1 t1 |
| 26 | get_frame_end_period f2 t1 |
| 27 | set_ST_GL_dividing_point p1 f1 L1 |
| 28 | set_ST_GL_dividing_point p2 f2 L1 |
| 29 | set_length_of_Polyline d1 L1 |
| 30 | greater_than d1 8.0 |
| 31 | set_X_distance_point_and_point d2 p1 p2 |
| 32 | less_than d2 5.0 |
| 33 | spatial_point_in p2, "Goal Area" |
| 34 | fill |
| 35 | t0 t1 |
| 36 | O0 O1 |
| 37 | L0 L1 |
| 38 | end |

TABLE 9

| Line | Define statement |
|---|---|
| 1 | wall pass: |
| 2 | begin |
| 3 | iact 1–2_pass t0 O0 L0 |
| 4 | child_iact Pass t1 O1 L1 |
| 5 | child_iact Pass t2 O2 L2 |
| 6 | child_act Stay Walk Run t3 o1 L3 |
| 7 | where |
| 8 | get_object_from_GO o2 1 O1 |
| 9 | get_object_from_GO o3 −1 O1 |
| 10 | get_object_from_GO o4 1 O2 |
| 11 | get_object_from_GO o5 −1 O2 |
| 12 | not_same_team o1 o2 |
| 13 | same_object o2 o5 |
| 14 | same_object o3 o4 |
| 15 | set_temporal_distance_period i1 t1 t2 |
| 16 | Less_Than i1 5 |
| 17 | not_same_team o1 o2 |
| 18 | set_temporal_concatination_period t4 t1 t2 |
| 19 | temporal_during t3 t4 |
| 20 | get_frame_start_of_period f1 t4 |
| 21 | get_frame_end_of_period f2 t1 |
| 22 | get_frame_end_of_period f3 t4 |
| 23 | set_ST_GL_dividing_point p1 L1 f1 |
| 24 | set_ST_GL_dividing_point p2 L1 f2 |
| 25 | set_ST_GL_dividing_point p3 L2 f3 |
| 26 | Create_Area A1 3 p1 p2 p3 |
| 27 | set_ST_GL_dividing_point p4 L3 f1 |
| 28 | set_ST_GL_dividing_point p5 L3 f3 |
| 29 | spatial_point_in p4 A1 |
| 30 | spatial_point_in p5 A1 |
| 31 | set_ST_GL_concatinate_polyline L4 L1 L2 |
| 32 | fill |
| 33 | t0 t4 |
| 34 | O0 O1 |
| 35 | L0 L4 |
| 36 | end |

TABLE 10

List of group of auxiliary functions:
(1) Functions suitable for soccer
    same_team ( Player0, Player1 )
    same_team ( Player, Location )
It shows whether Player0 and Player1 belong to the same team.
One of them may represent a position such as "GOAL."
(2) Functions that generally hold apart from soccer

| # | [Temporal] | |
|---|---|---|
| 1 | get_frame_start_of_period (f1, t1) | Assign the starting point of time interval t1 to f1. |
| 2 | get_frame_end_of_period (f1, t1) | Assign the ending point of time interval t1 to f1. |
| 3 | set_period_from_frames (t1, f1, f2) | Create time interval t1 from two time points f1, f2. |
| 4 | get_period_of_GL (t1, L1) | Assign the lifetime interval of trajectory L1 to time interval t1. |
| 5 | temporal_in (f1, t1) | Time point f1 is inside time interval t1. |
| 6 | temporal_meet (t1, t2) | t1 and t2 exist in this order, and ending point of t1 and starting point of t2 are the same. |
| 7 | temporal_overlap (t1, t2) | There is a time interval overlapping time intervals t1 and t2. |
| 8 | temporal_start (t1 ,t2) | Time intervals t1 and t2 have the same starting point. |
| 9 | temporal_finish (t1, t2) | Time intervals t1 and t2 have the same ending point |
| 10 | temporal_during (t1, t2) | Time interval t1 is completely included in time interval t2. |
| 11 | temporal_equal (t1,t2) | Time intervals t1 and t2 have the same starting and ending points. |
| 12 | temporal_before (t1,t2) | Time interval t1 ends earlier than the starting point of t2. No overlapping time interval. |
| 13 | set_temporal_overlapping_period (t1, t2, t3) | Assign the overlapping time intervals of t2 and t3 to t1. |
| 14 | set_temporal_concatination_period (t1, t2, t3) | Assign the concatenated time intervals of t2 and t3 to t1. |
| 15 | set_temporal_distance_period (i1, t2, t3) | Assign the difference between ending point of time interval t2 and starting point of t3 to i1. |

TABLE 10-continued

| # | | |
|---|---|---|
| 16 | set_ST_GL_dividing_locus (L1, t1, L2) | Assign to L1 the trajectory of a part applicable to partial interval t1 of the lifetime interval of trajectory L2. |
| 17 | set_ST_GL_concatinate_locus (L1, L2, L3) [Spatial] | Assign to L1 the trajectory concatenating trajectories L2 and L3. |
| 18 | set_ST_GL_dividing_point (p1, L1, f1) | Assign the position of trajectory L1 at time point f0 to p1. |
| 19 | set_point_from_locus (p1, I1) | Convert a point I1 of trajectory data to position data p1. |
| 20 | set_point (p1, i1, i2) | Define position p1 of which x, y coordinates are i1, i2. |
| 21 | Create_Polyline (P1, i1, p1, p2, . . .) | Create line P1 linking point sets made up of p1, p2, . . . (the number, i1). |

TABLE 11

(2) Functions that generally hold apart from soccer

| # | [Temporal] | |
|---|---|---|
| 22 | Create_Area (A1, i1, p1, p2, . . .) | Create polyline A1 linking point sets made up of p1, p2, . . . (the number, i1). |
| 23 | set_length_of_polyline (d1, X1) | Assign the length of the line shown by X1 to d1. X1 is P or L. |
| 24 | set_deistance_point_and_point (d1, p1, p2) | Assign the Euclid's distance between positions x1 and x2 to d1. x is p or 1. |
| 25 | set_X_distance_point_and_point (d1, x1, x2) | Assign the distance on axis x between positions x1 and x2 to d1. x is p or 1. |
| 26 | set_Y_distance_point_and_point (d1, x1, x2) | Assign the distance on axis y between positions x1 and x2 to d1. x is p or 1. |
| 27 | set_distance_point_and_line (d1, x1, P1) | Assign the distance between position x1 and line P1 to d1. x is p or 1. |
| 28 | set_distance_point_and_Area (d1, x1, A1) | Assign the distance between position x1 and polyline A1 to d1. x is p or 1. |
| 29 | spatial_point_in (p1, X1) | Position p1 is included in X1. X is P or A. |
| 30 | spatial_line_in (P1, A1) | Line P1 is completely included in polyline A1. |
| 31 | spatial_apart (P1, P2) | No overlap of two lines p1 and p2. |
| 32 | Spatial_line_touch (P1, X1) | There is a shared point between P1 and X1. X is P or A. |
| 33 | spatial_through (P1, A1) | P1 is penetrating polyline A1. |
| 34 | spatial_overlap (A1, A2) | Two polylines A1 & A2 are partly overlapping. |
| 35 | spatial_contain (A1, A2) | A1 is completely included in A2. |
| 36 | spatial_area_touch (A1, A2) | A1 and A2 are touching at a point or a line. |
| 37 | spatial_disjoint (A1, A2) | No shared part between A1 and A2. |
| 38 | spatial_cross (P1, P2) [Object handling] | Two lines P1 and P2 are crossing. |
| 39 | same_object (o1, o2) | Two objects o1 & o2 are the same objects. |
| 40 | not_same_object (o1, o2) | Two objects o1 & o2 are different. |
| 41 | get_object_from_GO (o1, i1, O1) | i1-th element of set of object O1 is o1. |
| 42 | set_GO_from_objects (O1, i1, o1, o2, . . .) | Create object set O1 from o1, o2. . . |
| 43 | get_number_from_GO (i1, O1) [Numerical] | To i1 seeking the number of elements of object set O1. |
| 44 | greater_than (x1, x2) | x1 > x2, x is f, d, o. |
| 45 | less_than (x1, x2) | x1 < x2, x is f, d, o. |
| 46 | equal (x1, x2) | x1 = x2, x is f, d, o. |

The invention claimed is:

1. A description means for contents of a motion picture, said means comprising:

(a) means for setting a reference plane by using a zone description and a camera model;

(b) means for describing each of a plurality of objects on said motion picture by position on said reference plane and a predefined type of actions, said describing means providing a description based on changes in the shape of an object wherein the shape of the object is determined by the silhouette of the object, changes in the silhouette show specific changes according to actions of the object, there are consecutive silhouettes of plural re-instructed action patterns, and input movement patterns are identified by comparison with the pre-instructed patterns; and (c) means for describing each of a plurality of scenes in said motion picture by using said means for describing each of a plurality of objects in respective ones of said scenes.

2. A search means for contents of a motion picture, said means comprising of:

(a) means for setting a reference plane by using a zone description and a camera model;

(b) means for describing each of a plurality of objects on said motion picture by position on said reference plane and a predefined type of actions, said describing means providing a description based on changes in the shape of an object wherein the shape of the object is determined by the silhouette of the object, changes in the silhouette show specific changes according to actions of the object, there are consecutive silhouettes of pre-instructed action patterns, and input movement patterns are identified by comparison with the pre-instructed patterns;
(c) means for describing each of a plurality of scenes in said motion picture by using said means for describing each of a plurality of objects in respective ones of said scenes; and
(d) means for searching the motion picture by using said means for describing each object or said means for describing each scene.

3. A description method for a motion picture, said method comprising the steps of:
(a) determining a reference plane by using a zone description and a camera model, wherein the reference plane represents information of objects and their positions included in said motion picture;
(b) representing changes over time of each of said object positions on said reference plane as a trajectory;
(c) setting a description unit based on a predefined type of actions of each of said objects by using changes in shape of each object so as to assign actions of each object as respective behavioral sections, wherein the shape of the object is determined by the silhouette of the object, changes in the silhouette show specific changes according to actions of the object, there are consecutive silhouettes of plural pre-instructed action patterns, and input movement patterns are identified by comparison with the pre-instructed patterns; and
(d) defining each of a plurality of scenes in said motion picture by a plurality of said objects.

4. A search method for a motion picture, said method comprising the steps of:
(a) setting a reference plane by using a zone description and a camera model, wherein the reference plane represents information of objects and their positions included in said motion picture;
(b) representing changes over time of each of said object positions on said reference plane as a trajectory;
(c) setting a description unit based on a predefined type of actions of each of said objects by using changes in shape of each of said objects so as to assign actions of each object as respective behavioral sections, wherein the shape of the object is determined by the silhouette of the object, changes in the silhouette show specific changes according actions of the object there are consecutive silhouettes of plural re-instructed action patterns, and input movement patterns are identified by comparison with the pre-instructed patterns;
(d) defining each of a plurality of scenes in said motion picture by a plurality of said objects; and
(e) searching for a specific one of said scenes by using said actions of each object for said one scene.

5. A description method for a motion picture, said method comprising the steps of:
(a) determining a reference plane from said motion picture by using a zone description and a camera model;
(b) cutting a region map for a region presented in said motion picture, identifying an object to obtain trajectory ID for an individual one of a plurality of objects in said motion picture, classifying action to obtain an action ID, and obtaining a camera parameter from said motion picture;
(c) creating a description of actions by each of said objects from said region map, said object trajectory ID, said action ID and said camera parameter, said description creating step also providing a description based on changes in the shape of an object wherein the shape of the object is determined by the silhouette of the object, changes in the silhouette show specific changes according to actions of the object, there are consecutive silhouettes of plural pre-instructed action patterns, and input movement patterns are identified by comparison with the pre-instructed patterns; and
(d) creating a description of scenes in said motion picture by using said description of actions by each of said objects.

6. A search method for a motion picture, said method comprising the steps of:
(a) determining a reference plane from said motion picture by using a zone description and a camera model;
(b) cutting a region map for a region presented in said motion picture, identifying an object to obtain trajectory ID for an individual one of a plurality of objects in said motion picture, classifying action to obtain an action ID and obtaining a camera parameter from said motion picture;
(c) creating a description of actions by each of said objects from said region map, said object trajectory ID, said action ID and said camera parameter, said description creating step also providing a description based on changes in the shape of an object wherein the shape of the object is determined by the silhouette of the object, changes in the silhouette show specific changes according to actions of the object, there are consecutive silhouettes of plural pre-instructed action patterns, and input movement patterns are identified by comparison with the pre-instructed patterns;
(d) creating a description of scenes in said motion picture by using said description of actions by each of said objects; and
(e) searching for a specific one of said scenes by using said description of actions by each object or said description of scenes.

7. A computer readable storage medium which has recorded a program, the program directing a computer to execute the steps of:
recording management data for searching a motion picture;
recording data of a description of actions by each of a plurality of objects defined by data of their respective positions on a reference plane and predefined types of actions, the reference plane being set by using a zone description and a camera model, wherein recorded data includes a description based on changes in the shape of an object, and the shape of the object is determined by the silhouette of the object, changes in the silhouette show specific changes according to actions of the object, there are consecutive silhouettes of plural pre-instructed action patterns, and input movement patterns are identified by comparison with the pre-instructed patterns; and
recording data of a description of scenes defined by said data of description of actions.

8. A computer readable storage medium which has recorded a program, said program directing a computer to execute the steps of:
(a) determining a reference plane set by using a zone description and a camera model, the reference plane representing information of objects and their positions included in a motion picture;
(b) representing changes over time of each of each of said object positions on said reference plane as a trajectory;
(c) setting a description unit based on predefined types of actions of each of said objects by using changes in shape of each object so as to assign actions of each object as a respective behavioral section, wherein the shape of the object is determined by the silhouette of the object, changes in the silhouette show specific changes according to actions of the object, there are consecutive silhouettes of plural pre-instructed action patterns, and input movement patterns are identified by comparison with the pre-instructed patterns; and (d) defining each of a plurality of scenes in said motion picture by plural ones of said objects.

9. The description means of claim 1 wherein the reference plane comprises information on object positions independently of a camera movement.

10. The description means of claim 1 wherein the reference plane represents a ground for determining positions of objects in relation to an actual direction of motion of the object.

11. The search means of claim 2 wherein the reference plane comprises information on object positions independently of a camera movement.

12. The search means of claim 2 wherein the reference plane represents a ground for determining positions of objects in relation to an actual direction of motion of the object.

13. The description method of claim 3 wherein the reference plane further represents motion of objects independently of camera motion.

14. The description method of claim 3 wherein the reference plane further represents a ground for determining position and movement of objects in relation to an actual direction of motion of each of respective ones of the objects that is independent of a camera motion.

15. The search method of claim 4 wherein setting the reference plane further comprises setting a ground for determining position and movement of objects in relation to an actual direction of motion of an individual one of the objects that is independent of a camera motion.

16. The description method of claim 5 wherein determining the reference plane further comprises setting a ground for determining position and movement of objects in relation to an actual direction of motion of an individual one of the objects that is independent of a camera motion.

17. The search method of claim 6 wherein determining the reference plane further comprises setting a ground for determining position and movement of respective ones of said objects in relation to an actual direction of motion of an individual one of the objects that is independent of a camera motion.

18. The computer readable storage medium of claim 8 wherein the reference plane further represents a ground for determining actual object position and movement included in the motion picture that is independent of a camera motion tracking the object position and movement.

19. A computer readable storage medium which has recorded a program, said program directing a computer to execute the steps of:

(a) setting a reference plane by using a zone description and a camera model, the reference plane representing information of object positions included in a motion picture;

(b) representing changes over time of each object position on said reference plane as a trajectory;

(c) setting a description unit based on predefined types of actions of each object by using changes in shape of each object so as to assign actions of each object as a respective behavioral section, wherein the shape of the object is determined by the silhouette of the object, changes in the silhouette show specific changes according to actions of the object, there are consecutive silhouettes of plural pre-instructed action patterns, and input movement patterns are identified by comparison with the pre-instructed patterns;

(d) defining each of a plurality of scenes of said motion picture by plural ones of said objects; and (e) searching a specific one of said scenes by using said actions of each object for said one scene.

\* \* \* \* \*